(12) United States Patent
Chalfant

(10) Patent No.: US 7,703,245 B2
(45) Date of Patent: Apr. 27, 2010

(54) LOADING DOCK DOOR SEAL

(75) Inventor: Jeffrey R. Chalfant, Olmsted Falls, OH (US)

(73) Assignee: Chalfant Sewing Fabricators, Inc., Cleveland, OH (US)

( * ) Notice: Subject to any disclaimer, the term of this patent is extended or adjusted under 35 U.S.C. 154(b) by 0 days.

(21) Appl. No.: 12/133,648

(22) Filed: Jun. 5, 2008

(65) Prior Publication Data
US 2008/0289270 A1 Nov. 27, 2008

Related U.S. Application Data

(63) Continuation of application No. 10/805,808, filed on Mar. 22, 2004, now Pat. No. 7,383,664.

(60) Provisional application No. 60/525,619, filed on Nov. 26, 2003.

(51) Int. Cl.
E04B 1/62 (2006.01)
(52) U.S. Cl. .................. 52/173.2; 52/2.12; 52/173.1; 52/718.05
(58) Field of Classification Search .................. 52/2.12, 52/718.05, 173.2, 173.1; 49/483.1, 490.1
See application file for complete search history.

(56) References Cited

U.S. PATENT DOCUMENTS

| | | | |
|---|---|---|---|
| 2,704,574 A | 3/1955 | Etlar | |
| 3,230,675 A | 1/1966 | Frommelt et al. | |
| 3,375,625 A | 4/1968 | Edkins et al. | |
| 3,403,489 A | 10/1968 | Frommelt et al. | |
| 3,427,776 A | 2/1969 | Lake et al. | |
| 3,818,521 A | 6/1974 | Richards, Jr. | |
| 3,934,380 A | 1/1976 | Frommelt et al. | |
| 3,935,684 A | 2/1976 | Frommelt et al. | |
| 4,015,380 A | 4/1977 | Chalfant | |
| 4,038,792 A | 8/1977 | McGuire et al. | |
| 4,213,279 A | 7/1980 | Layne | |
| 4,322,923 A | 4/1982 | O'Neal | |
| 4,638,612 A | 1/1987 | Bennett | |
| 4,679,364 A | 7/1987 | Fettig et al. | |
| 4,718,207 A | 1/1988 | Frommelt | |
| 4,799,342 A | 1/1989 | Klevnjans | |
| 4,885,881 A | 12/1989 | Lenz | |

(Continued)

FOREIGN PATENT DOCUMENTS

DE 3536845 A1 * 4/1987

(Continued)

*Primary Examiner*—Phi D. A
(74) *Attorney, Agent, or Firm*—Pearne & Gordon LLP

(57) ABSTRACT

A seal system is utilized with flat, rough, and/or ribbed wall surfaces and includes a top dock pad and two substantially parallel side dock pads, which substantially frame a doorway at a loading dock. The dock pads are secured to the wall by a plurality of mounting brackets. The dock pads include a first foam layer coupled to a rear portion of a backing structure. The first foam layer operates to accommodate, or substantially "fill-in", any surface irregularities of the building wall surface, such as a rough wall texture and rib surfaces, to provide an airtight or substantially airtight seal between the building and the seal structure. The dock pads also include a second foam layer coupled to a front portion of the backing structure. The second foam layer is employed to create an effective seal between the building and a rear portion of a vehicle.

12 Claims, 5 Drawing Sheets

U.S. PATENT DOCUMENTS

| | | |
|---|---|---|
| 5,333,424 A | 8/1994 | Chalfant et al. |
| 5,442,825 A | 8/1995 | Hahn et al. |
| 5,622,016 A | 4/1997 | Frommelt et al. |
| 5,661,934 A | 9/1997 | Weisflog |
| 5,775,044 A | 7/1998 | Styba et al. |
| 5,953,868 A | 9/1999 | Giuliani et al. |
| 5,996,291 A | 12/1999 | Styba et al. |
| 6,006,389 A | 12/1999 | Alexander |
| 6,170,205 B1 | 1/2001 | Styba |
| 6,272,799 B1 | 8/2001 | Ashelin et al. |
| 6,276,119 B1 | 8/2001 | Oshima et al. |
| 6,311,435 B1 | 11/2001 | Brockman et al. |
| 6,854,224 B2 | 2/2005 | Thill et al. |
| 2003/0177720 A1 | 9/2003 | Hoffmann et al. |
| 2003/0200714 A1 | 10/2003 | Minke et al. |
| 2003/0230033 A1 | 12/2003 | Shelton |
| 2004/0123532 A1 | 7/2004 | Thill et al. |
| 2004/0226228 A1 | 11/2004 | Digmann et al. |

FOREIGN PATENT DOCUMENTS

| | | |
|---|---|---|
| DE | 3631591 A1 * | 7/1987 |
| DE | 4128168 | 3/1993 |
| EP | 567441 | 10/1993 |

* cited by examiner

LOADING DOCK DOOR SEAL

This application is a continuation of application Ser. No. 10/805,808 filed Mar. 22, 2004, now U.S. Pat. No. 7,383,664. This application claims the benefit of U.S. Provisional Patent Application Ser. No. 60/525,619 filed Nov. 26, 2003.

TECHNICAL FIELD

The present invention generally relates to loading docks. In particular, the present invention relates to systems and methods for a loading dock door seal.

BACKGROUND OF THE INVENTION

Loading docks are common features of warehouses, retail stores, and other structures where trucks load and unload cargo. A typical loading dock has an opening ranging from 6 to 9 feet in width and 7 to 13 feet in height. A rubber bumper is typically placed along the bottom side of the opening to mitigate damage to the cargo body when trucks or trailers back up to the loading dock.

While the rubber bumper ensures that the cargo body does not come in contact with the building, it also creates gaps between the side and top walls of the cargo body and the building structure. Left unblocked, these gaps may allow environment effects, such as heat, cold, rain, and/or snow, as well as bugs, rodents, and other small animals into the building. To mitigate this, pads are typically installed along the edges of the loading dock. The pads act to fill these gaps and maintain a seal between the loading dock and the cargo body. A typical pad contains a foam rubber core secured to a wood frame and wrapped in a tough waterproof exterior covering. The wrapped pad and frame are then typically mounted to the loading dock doorway using metal brackets. An example of loading dock pads are described in U.S. Pat. No. 5,333,424, the contents of which are incorporated herein by reference in their entirety.

While door seals are easily installed on smooth-sided buildings, buildings with uneven exteriors pose difficulties in installation. One common building exterior type contains regularly spaced ridges. The use of prior art door seal mountings generally requires cutting out sections of the ridges during installation of the door seal. This is generally needed because the ridge interferes with the mounting of a bracket used to hold the mounting in place. Even if a seal mount can be attached without cutting the ridge, for example, by welding the mount instead of using fastening brackets, the ridge often obscures the side of the mounting. In such an occluded position, it becomes difficult or impossible to secure the frame and seal in the mount by usual methods, for example, by passing lag screws through the side of the mount and into the frame.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention is directed to a seal structure that facilitates improved sealing between a truck, or trailer, and a loading dock doorframe. In accordance with a first aspect of the present invention, a seal system is provided. The seal system includes one or more dock pads. The dock pad(s) includes a backing structure having a front portion and an opposing rear portion; a first foam layer coupled to the rear portion of the backing structure to provide a seal between a building surface and the dock pad; and a second foam layer coupled to the front portion of the backing structure to provide a seal between the dock pad and a vehicle.

In accordance with another aspect of the present invention, a seal system is provided. The seal system includes at least one dock pad having a backing structure; a foam layer secured to the backing structure; and a theft deterrence component substantially covering at least one side of the foam layer.

In accordance with yet another aspect of the present invention, a seal system includes at least one dock pad having a backing structure and at least one foam layer; and a plurality of mounting brackets to secure the at least one dock pad to a building; wherein the mounting brackets form a U-shaped channel having one long leg and two short legs, the two short legs having different lengths.

In accordance with yet another aspect of the present invention, a seal system includes means for providing a substantially airtight seal between a dock pad and a building surface; means for providing a seal or a substantially airtight seal between the dock pad and a rear portion of a vehicle; and means for providing rigidity to the dock pad.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE PREFERRED EMBODIMENTS OF THE INVENTION

Figure 1:
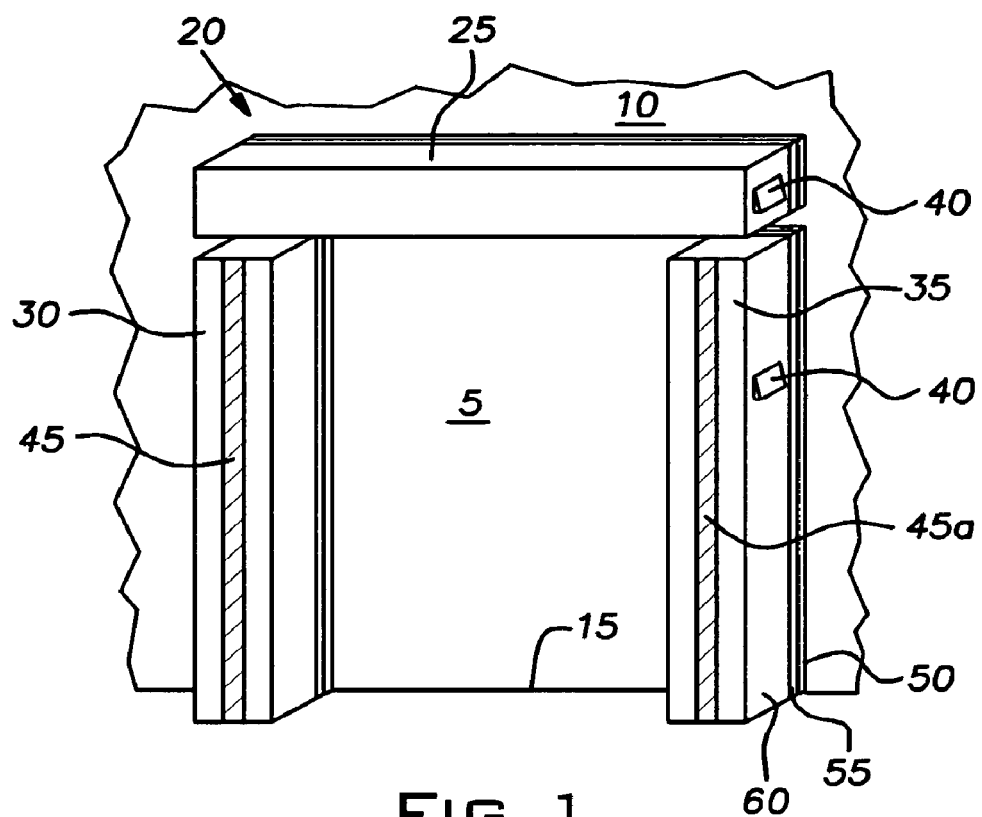
FIG. 1 illustrates a perspective view of a seal system in accordance with an aspect of the present invention, but the back part of the fabric covering is not shown so as to reveal the backing structure and the back layer of foam.

The present invention relates to a seal system for a loading dock. The present invention will now be described with reference to the drawings, wherein like reference numerals are used to refer to like elements throughout. It is to be appreciated that the various drawings are not drawn to scale from one figure to another nor inside a given figure, and in particular that the size of the components are arbitrarily drawn for facilitating the reading of the drawings. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

In accordance with an aspect of the present invention, a seal system is provided that can be employed with flat, rough, and/or ribbed wall surfaces and for door openings which have a drip edge above the door opening. The seal system provides many advantages over the current seal designs. For example, as will be discussed in greater detail herein, the seal structure of the present invention mitigates the need for caulking between dock pads and wall surfaces several times a year to prevent water leakage; facilitates rodent and bug control; deters theft; and facilitates an improved seal between the trucks or trailers and the loading docks. Moreover, the seal structure mitigates or eliminates the need for hoods located above the dock pads, as the structure substantially mitigates sagging, especially in the head pad where it is often problematic and also mitigates or eliminates rain leakage. The invented seal system stops rodents and rain seepage or leakage between the dock pad and the building (for both smooth and rough surfaces on the building).

Referring initially to FIG. 1, a doorway 5 in an outside wall of a building or the like 10, at a docking station whereat a cargo body of a truck or trailer (not shown) is backed into an loading and unloading position, is illustrated. A floor 15 located beneath the doorway 5 (e.g., a floor of a dock) is located at a level that may or may not correspond with a floor of the cargo body to facilitate the loading and unloading of cargo. Accordingly, an adjustable platform (not shown) can be provided on the cargo body to accommodate different levels of the floor 15 of the dock.

A shelter or seal structure 20 is provided around the doorway 5 to cooperate with a rear end of the cargo body and protect the cargo and workers from weather conditions, such as rain, snow, wind, and cold. The seal structure 20 includes a top dock pad 25 located over the doorway 5 and two substantially parallel side dock pads 30 and 35 located on opposing sides of the doorway 5. Vents 40 at each end of the top and side dock pads permit escape and entry of air during compression and expansion, respectively. A center strip 45, 45a (yellow in color, for example) can be provided on an outer face of the side dock pads 30, 35 to serve as a visual guide to a vehicle driver during a backing operation. Although not illustrated, a similar center strip can also be provided on the top dock pad to serve as an additional, or alternative, visual guide to the driver.

The dock pads 25, 30, 35 are secured to the outside wall of the building 10 by a plurality of mounting brackets, which will be described in further detail below. However, it is to be appreciated that the dock pads 25, 30, 35 can be secured to the building in a variety of different ways as will be readily apparent to those skilled in the art. The dock pads are shown without the back part of the covering material to better reveal the parts.

Figure 2:
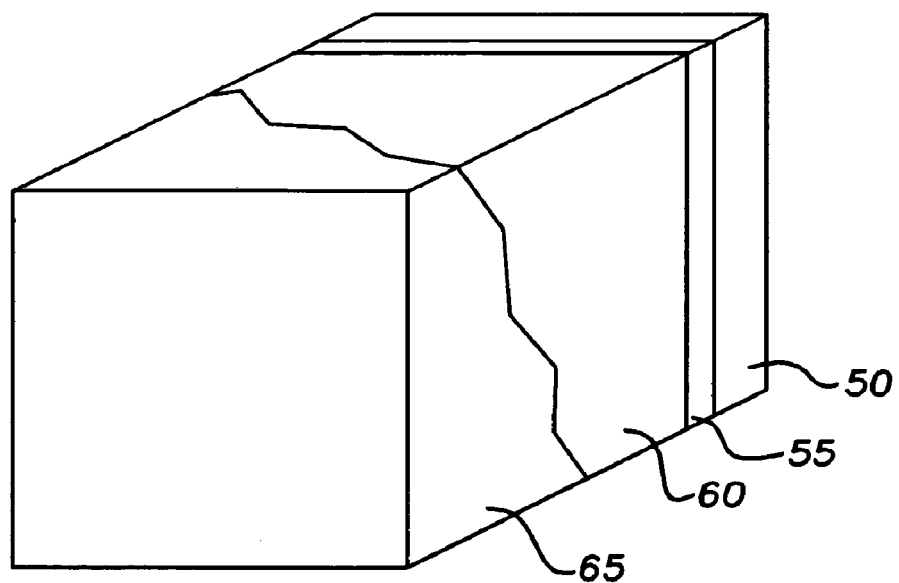
FIG. 2 illustrates a perspective view of a top dock pad section and a side dock pad section in accordance with an aspect of the present invention.
Figure 3:
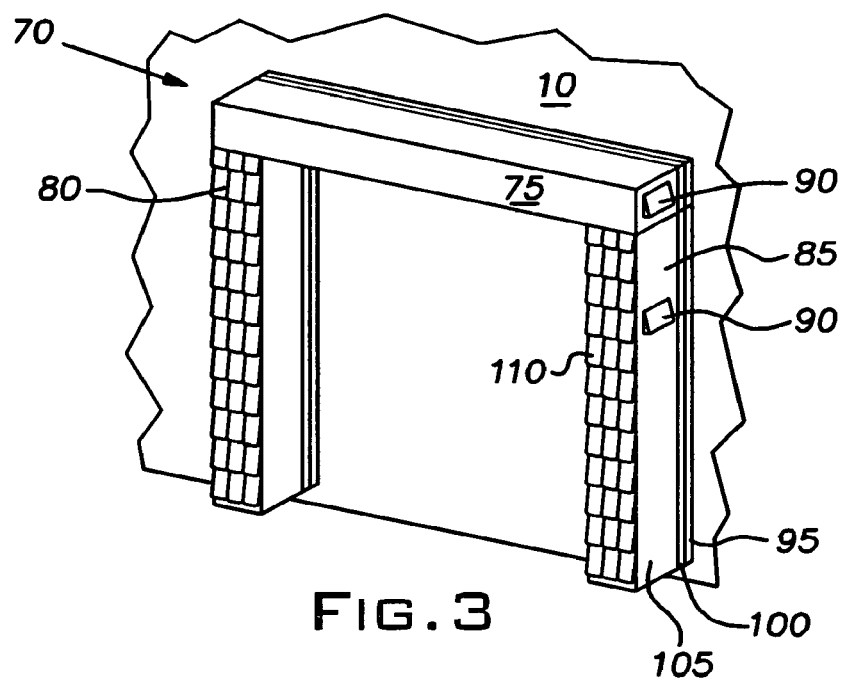
FIG. 3 illustrates a perspective view of a seal system with pleats in accordance with an aspect of the present invention.

As can be seen in greater detail in FIG. 2, the dock pads 25, 30, 35 include a first foam layer 50 coupled to a rear portion of a backing structure 55. Thus, the first foam layer 50 is located between a wall of the building 10 and the backing structure 55 when mounted to the building 10. The first foam layer 50 operates to accommodate, or substantially "fill-in", any surface irregularities of the building wall surface, such as a rough wall texture (e.g., stucco) and rib surfaces, to provide an airtight or substantially airtight seal between the building 10 and the seal structure 20; thereby preventing bugs and rodents from entering the building 10 and eliminating the need for caulking around the dock pads. The first foam layer 50 also mitigates water leakage between building 10 and the seal structure 20. Accordingly, the present invention eliminates the need for hoods, which are conventionally placed over top dock pads to prevent water leakage. Additionally, due to the substantially air-tight structure of the seal structure of the present invention, significant cost savings can be realized with respect to heating and air-conditioning. The first foam layer 50 is preferably a one-half inch to one-inch foam backing employed to improve the seal between the building 10 and a back portion of the dock pads 25, 30, 35. However, the first foam layer 50 can be of any suitable thickness and is contemplated as falling within the scope of the present invention.

The backing structure 55 can be manufactured from wood, steel, plastic, or any other suitable material such that the backing structure 55 provides rigidity to the seal structure 20. The backing structure 55 is also employed to secure the seal structure 20 to the building 10 via mounting brackets or the like. For example, the backing structure 55 can be a 2-inch kiln dried wood, sealed with wood preservative. As another example, the backing structure 55 of the dock pads can be of steel (e.g., 16 gauge galvanized steel).

The dock pads 25, 30, 35 also include a second foam layer 60 coupled to a front portion of the backing structure 55. The second foam layer 60 can be of a rectangular or trapezoidal cross section and extends approximately 12 inches from the backing structure 55. However, the second foam layer 60 can extend from the backing structure 55 by any suitable dimension and is contemplated as falling within the scope of the present invention. Thus, the dock pads 25, 30, 35 can extend from the doorframe approximately 15 inches and can compress approximately 6 inches to create an effective seal between the building 10 and the truck. Accordingly, when a truck backs into a loading dock, the dock pads 25, 30, 35 compress against the wall of the building 10. When the truck pulls away from the building 10, the pads 25, 30, 35 release to remove pressure off building walls thereby releasing strain.

The first and second foam layers 50, 60 can be formed of a suitable flexible material, such as 1030 polyurethane foam obtained by Luxaire Cushion Co. located in Newton Falls, Ohio 44444. The foam layers 50, 60 are preferably about 1 or 0.5-2 or 0.4-3 or 0.3-4 lb density per cubic foot weight with about 30 lb compression factor, compressing from about 12 inches to about 4 inches, resilience from about +180 F to about −50 F with aging and non-sagging properties, and with about 90% return on compression with standard truck usage.

However, it is to be appreciated that the first and second foam layers 50, 60 can be formed from any suitable rigid foam, semi-rigid foam, flexible foam, or combination thereof. The first and second foam layers 50, 60 are preferably of flexible foam and less preferably of rigid and semi-rigid foams. For example, the foam layers 50, 60 are preferably polyurethane foam, alternatively other flexible foams such as closed cell polyvinyl chloride (PVC) flexible foam, lower temperature PVC foams, polymeric PVC foams, polyethylene foam, other vinyl foams, polypropylene foam, or any other suitable foam can be employed. The foam layers 50, 60 preferably have a density from about 1 lb/ft$^3$ to about 2 lb/ft$^3$, more preferably about 1.3 lb/ft$^3$. However, any suitable density foam can be utilized.

Additionally, the second foam layer 60 of the head pad 25 can be constructed of three-stage foam to mitigate sagging in the head pad 25. The three-stage foam combines three different foam materials, such as the flexible foams described above, with three distinctive foam densities.

Exposed portions of the dock pads 25, 30, 35 can be completely or substantially covered with a covering material 65 (partially shown in FIG. 2), such as fabric, to protect the dock pads 25, 30, 35 from environmental elements, thereby extending a life of the dock pads 25, 30, 35. For example, the fabric 65 can be a 22 oz. Vinyl coated polyester base with a flex design to provide maximum resistance to abrasion on the dock pads 25, 30, 35. However, any suitable fabric, such as 40 oz. Vinyl, 40 oz. Hypalon, or 16 oz. Neoprene can be employed. The fabric 65 can be replaced as often as necessary to further extend the life of the dock pads 25, 30, 35. The first and second foam layers 50, 60 can be bonded (e.g., chemically, thermally) to the fabric 65 and the backing structure 55 to mitigate twisting that can occur from truck usage. Preferably covering material 65 completely surrounds and encases foam layers 50, 60 and backing structure 55.

Turning now to FIGS. 3-6, an alternative seal structure 70 is depicted in accordance with an aspect of the present invention. The alternative seal structure 70 includes top dock pad 75 and two substantially parallel side dock pads 80 and 85. Vents 90 at each end of the top and side dock pads permit escape and entry of air during compression and expansion, respectively. Center strips (not shown) can be provided on the head and/or side dock pads to serve as visual guides to a vehicle driver during a backing operation. The dock pads 75, 80, 85 include a first foam layer 95, which is coupled to a rear portion of a backing structure 100, to accommodate, or substantially fill-in, any surface irregularities of a building wall surface, such as a rough wall texture (e.g., stucco) and rib surfaces, to provide an airtight or substantially airtight seal between the building 10 and the seal structure 70. The back part of the covering material is not shown so as to reveal the backing structure and the back layer of foam.

The dock pads 75, 80, 85 also include a second foam layer 105 coupled to a front portion of the backing structure 100 to provide an airtight or substantially airtight or non-airtight seal between the truck and the dock pads 75, 80, 85. The second foam layer 105 can include pleats 110 on a surface portion of the foam layer 105 to provide added protection from abrasion caused by vertical motion of a truck or trailer bed, as it is being loaded or unloaded. The pleats 110 are able to move with the motion of the truck; thereby, absorbing abrasive action and mitigating premature dock shelter wear. The pleats 110 can include an extra wearface of 40 oz. Vinyl, Hypalon, or Neoprene in addition to, the normal wearface on the dock pads. The pleats 110 are secured to the dock pads 75, 80, 85 with horizontal seams. The head pad 75 can include 40 oz. Vinyl coated nylon wearface across the head pad 75 and 40 oz. Vinyl coated polyester pleats on corners of the head pad 75.

Figure 4:
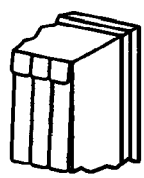
FIG. 4 illustrates a perspective view of a dock pad section in accordance with an aspect of the present invention.
Figure 5:
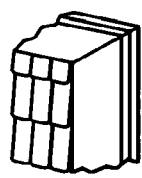
FIG. 5 illustrates a perspective view of a dock pad section in accordance with an aspect of the present invention.
Figure 6:
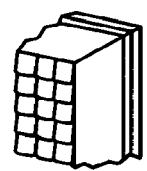
FIG. 6 illustrates a perspective view of a dock pad section in accordance with an aspect of the present invention.

The size and number of pleats 110 on the dock pads 75, 80, 85 can vary depending on the amount of exposure the dock pads 75, 80, 85 will experience. For example, FIG. 4 illustrates a pleat configuration that can be used on a seal system with light duty exposure; FIG. 5 illustrates a pleat configuration that can be used on a seal system with medium duty exposure; and FIG. 6 illustrates a pleat configuration that can be used on a seal system with heavy duty exposure.

Figure 7:
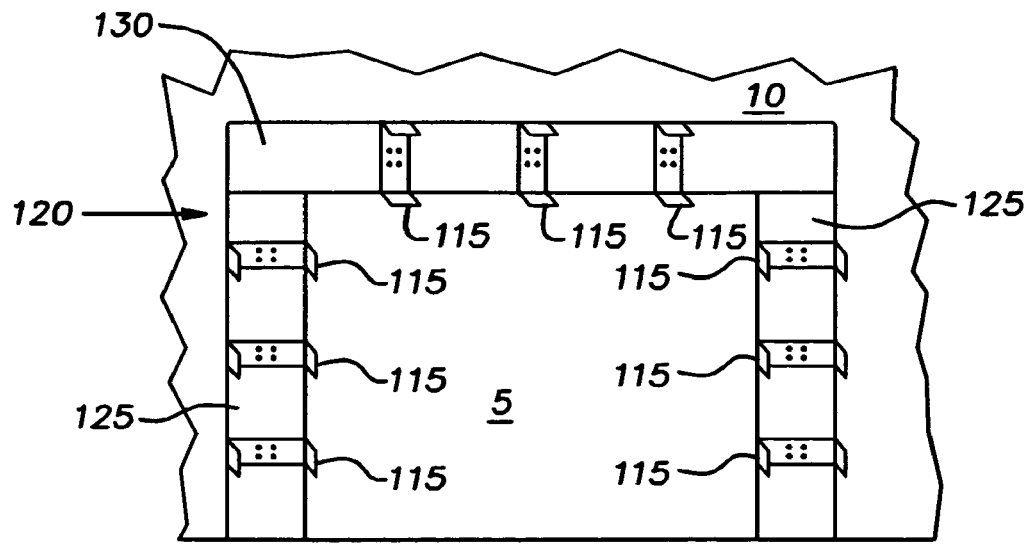
FIG. 7 illustrates a front view of a system for securing a plurality of dock pads to a building in accordance with an aspect of the present invention.

FIG. 7 depicts a system for securing one or more dock pads to an outside wall of the building 10. The system includes a plurality of mounting brackets 115, which are adapted to be secured to a backing structure of the dock pad(s). The mounting brackets 115 can be secured directly to the wall of the building 10. Alternatively, the mounting brackets 115 can be secured to a doorframe 120 provided around the doorway 5 of the building 10. The doorframe 120 can include two side members 125 and a top member 130. Each side member 125 includes one or more mounting brackets 115, preferably three, and each top member 130 includes one or more mounting brackets 115, preferably three.

Figure 8:
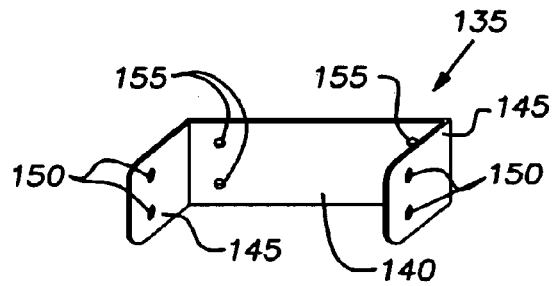
FIG. 8 illustrates a perspective view of a side mounting bracket in accordance with an aspect of the present invention.
Figure 9:
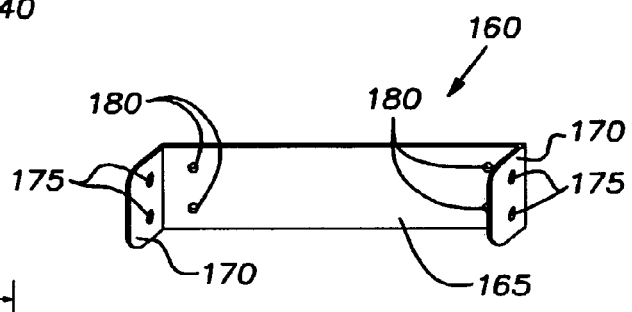
FIG. 9 illustrates a perspective view of a top mounting bracket in accordance with an aspect of the present invention.

FIGS. 8-9 illustrates examples of mounting brackets that can be employed to secure the dock pads to the building. The mounting brackets facilitate easy installation, removal, and/or changeability of the dock pads. Referring to FIG. 8, a side mounting bracket 135 is shown in accordance with an aspect of the present invention. The side mounting bracket 135 forms a U-shaped channel having one long leg 140 and two short legs 145 extending perpendicularly from the ends of the long leg 140. Lag screws, or any other suitable fastener, (not shown) can be passed through apertures 150 in the short legs 145 to secure a side dock pad to the side mounting bracket 135. Likewise, lag screws, or any other suitable fastener (not shown) can be passed through apertures 155 in the long leg 140 to secure the mounting bracket to the building wall or doorframe. The long leg 140 of the side mounting bracket 135 can be approximately 7.5 inches long and approximately 3 inches wide. The short legs 145 of the bracket 135 can be about 2 inches long and also approximately 3 inches wide. The bracket 135 is preferably formed from 10 to 16 gauge steel, more preferably 12 to 14 gauge steel, more preferably 13 gauge steel. Top edges of the short legs 145 can be rounded to avoid damage to the dock pad and/or a fabric cover.

Referring to FIG. 9, a top mounting bracket 160 is similar to the side mounting brackets 135, except that a long leg 165 of the top bracket 160 is approximately 11.25 inches long, and short legs 170 of the top bracket 160 are approximately 1.5 inches long. The long leg 165 and short legs 170 are approximately 3 inches wide. The bracket 160 is preferably formed from 10 to 16 gauge steel, more preferably 12 to 14 gauge steel, more preferably 13 gauge steel. Top edges of the short legs 170 can be rounded to avoid damage to the dock pad and/or a fabric cover. The top mounting bracket 160 also includes apertures 175 in the short legs 170 for securing a dock pad to the mounting bracket 160 and apertures 180 in the long leg 165 for securing the mounting bracket 160 to a building wall or doorframe.

Although preferable dimensions of the mounting brackets 135, 160 have been discussed herein, the mounting brackets 135, 160 can include any suitable dimension as will be appreciated by one of ordinary skill in the art.

The side and top mounting brackets 135, 160 are secured to the building wall or doorframe in the illustrated embodiment by using one or more, preferably four, bolts, screws, or other suitable fasteners. The apertures 150, 155, 175, 180 in the side and top mounting brackets 135, 160 can be pre-drilled to facilitate installation of the bracket. However it is to be appreciated that the mounting brackets 135, 160 can be custom drilled during installation. It is to be further appreciated that the mounting brackets 135, 160 can include any number of holes and can be secured to the building in any other suitable fashion. For example, the mounting brackets 135, 160 can be spot-welded to the building exterior or support members. Additionally, the mounting brackets 135, 160 can be adjustable. For example, instead of employing a plurality of round apertures for securing the brackets 135, 160 to the building and/or backing structure, the brackets 135, 160 can include one or more slotted apertures (not shown), such that the mounting brackets 135, 160 can be slidably adjusted with respect to the corresponding aperture in the building and/or backing structure.

Figure 10:
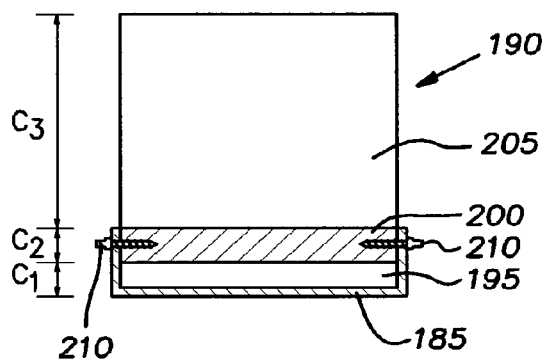
FIG. 10 illustrates a cross sectional view of a mounting bracket and dock pad assembly in accordance with an aspect of the present invention.

Turning now to FIG. 10, a cross sectional view of a mounting bracket 185 and dock pad 190 assembly is illustrated in accordance with an aspect of the present invention. In the preferred embodiment, the dock pad 190 includes a first foam layer 195, a backing structure 200, and a second foam layer 205. The first foam layer 195 can be approximately one-half to one inch in cross section $C_1$. The backing structure 200 can include a 2×8 or 2×12 wood board, measuring approximately 7.25 or 11.25 inches by 1.5 inches in cross section $C_2$, cut to the desired length of the first and second foam layers 195, 205. The second foam layer is secured to the 2×8 or 2×12 board via an adhesive. The foam layers are preferably manufactured from flexible foam, as discussed above. The second foam layer 205 has a cross section $C_3$ ranging from about 8 inches to about 24 inches, and preferably about 12 inches. The overall width W of the dock pad 190 is determined by a desired width of a dock door opening after installation of the seal structure. It is often preferable to use pads to close the width of the loading dock door down to the range of approximately 7 feet 4 inches to 8 feet 0 inches. Such a width is commonly required when a cargo body is mounted on a city truck. After the first and second foam layers 195, 205 are secured to the backing structure 200, the assembly is enclosed in a removable exterior cover (not shown). The removable exterior cover is tough and waterproof and protects the seal structure from weather and mechanical damage. The enclosed dock pads are then secured to the mounting brackets 185 using lag screws 210 or any other suitable fastener.

Figure 11:
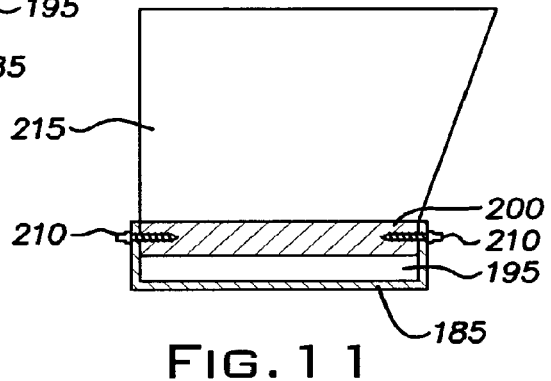
FIG. 11 illustrates a cross sectional view of another mounting bracket and dock pad assembly in accordance with an aspect of the present invention.

Often there are differences between the dimensions and levels of the loading dock and cargo body. Such differences can cause misalignment between the installed pads and an end portion of the cargo body. Accordingly, bevel pads can be installed around the loading dock door to address this misalignment problem. An example of a bevel pad 215 is depicted in FIG. 11. The bevel pad 215 presents a trapezoidal cross-section when viewed along its long axis. The long side of the trapezoid faces the cargo body. The bevel pad 215 has the effect of extending the sides of the doorway inward or the top of the doorway downward, allowing a narrower or shorter cargo body to mate with the doorway and create a seal. Thus, it is to be appreciated that the present invention can be employed with dock pads having a trapezoidal cross section, as shown in FIG. 11, a substantially rectangular cross section, as shown in FIG. 10, or any other suitable or desired cross section.

Figure 12:
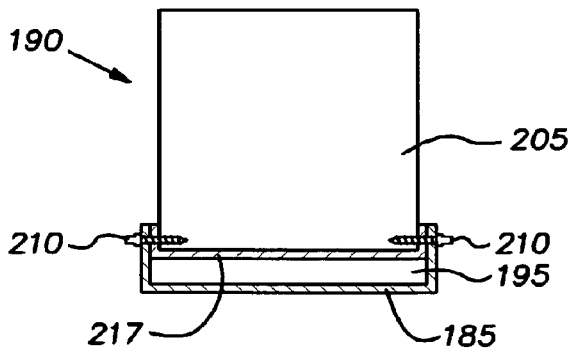
FIG. 12 illustrates a cross sectional view of another mounting bracket and dock pad assembly in accordance with an aspect of the present invention.

As another alternative, the dock pads 190 can include a steel backing structure 217, as depicted in FIG. 12. The steel backing 217 is substantially U-shaped and thus, includes one long leg and two short legs, similar to the mounting brackets described herein. The steel backing 217 is dimensioned such that the length of the steel backing structure 217 corresponds with a length of a corresponding dock pad 190 and the overall width of the steel backing structure 217 corresponds with an inner width of a corresponding mounting bracket 185. The steel backing structure 217 is preferably a 16 gauge galvanized steel; however any other suitable steel or rigid material can be employed and is contemplated as falling within the scope of the present invention.

Figure 13:
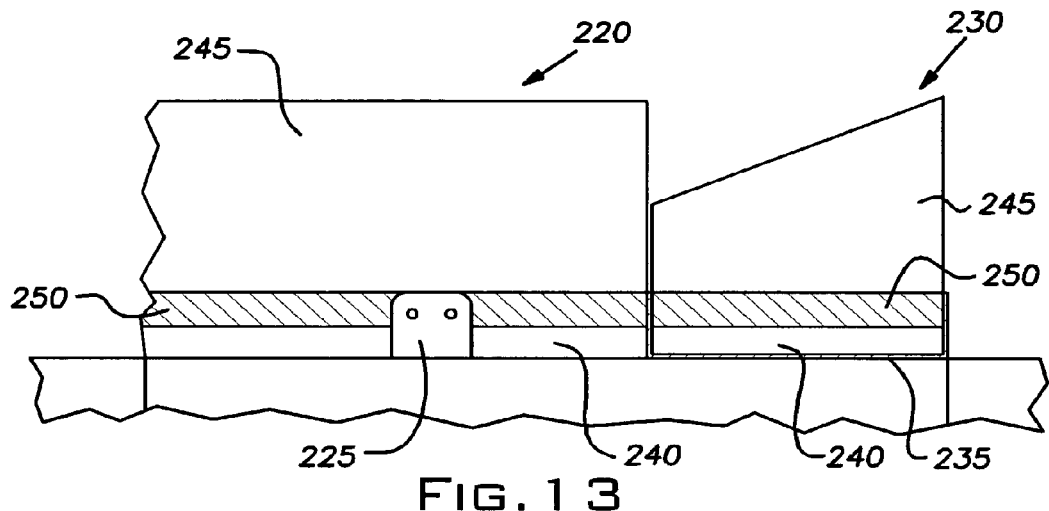
FIG. 13 illustrates a partial top view of a seal system in accordance with an aspect of the present invention.

FIG. 13 illustrates a partial top view of a seal system in accordance with an aspect of the present invention. The system includes a top dock pad 220 secured to a building via one or more (preferably 3) top mounting brackets 225 and two side dock pads 230 (only one is shown in FIG. 13) secured to the building via one or more (preferably 3) side mounting brackets 235. Both the top and side dock pads 220, 230 include first and second foam layers 240, 245, respectively, with a wood board backing structure 250 disposed therebetween, as is discussed in greater detail herein. The side dock pad 230 is illustrated as having a bevel pad; however any shape dock pad can be employed.

Figure 14:
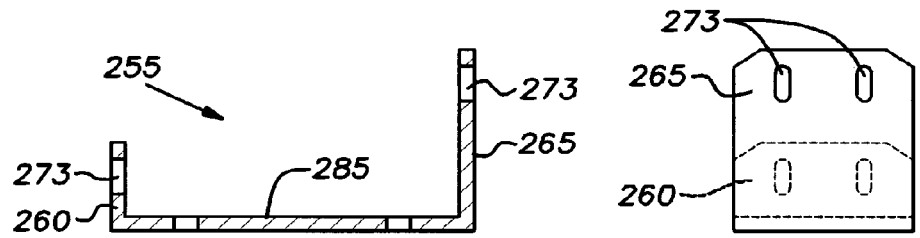
FIG. 14 illustrates a cross sectional side view of a mounting bracket for a ribbed wall surface in accordance with an aspect of the present invention.
Figure 15:
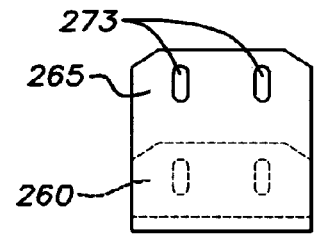
FIG. 15 illustrates an end view of a mounting bracket for a ribbed wall surface in accordance with an aspect of the present invention.
Figure 16:
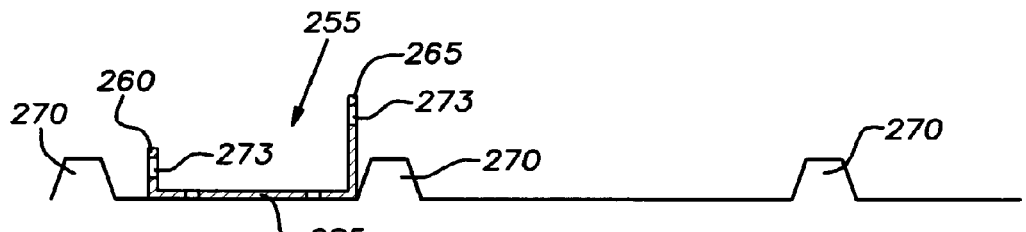
FIG. 16 illustrates a top view of a mounting bracket employed with a ribbed wall surface in accordance with an aspect of the present invention.

The mounting brackets that have been described above can be employed with smooth and/or rough building wall surfaces. However, if the building has a ribbed wall surface or a drip edge above the door opening, at least one of the short legs of the mounting brackets could pose clearance problems with respect to the ribs or drip edge. Accordingly, mounting brackets having short legs of different lengths can be employed, as depicted in FIGS. 14-16. For example, a mounting bracket 255 can include a first short leg 260 of the approximately 2 inches long and a second short leg 265 of approximately 3 inches long. It is to be appreciated that the mounting bracket 255 can include first and second short legs 260, 265 of any suitable length. The second short leg 265 is employed to clear the height of a rib structure 270 on the wall, such that a user has access to couple the bracket 255 to a backing structure via an aperture or slot 273 located in the short legs. Thus, the user can mount the brackets 255 between the ribs 270 without the need to cut the ribs 270, as is done with conventional systems. As above, the bracket 255 is preferably formed from 6 to 20 or 10 to 16 gauge steel, more preferably 12 to 14 gauge steel, more preferably 13 gauge steel.

Figure 17:
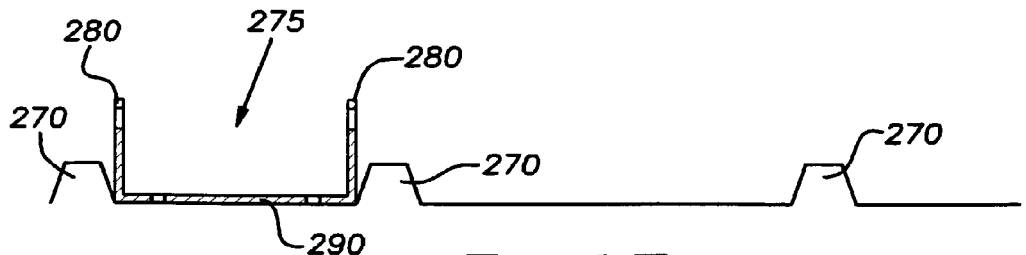
FIG. 17 illustrates a top view of another mounting bracket employed with a ribbed wall surface in accordance with an aspect of the present invention.

As another alternative, a mounting bracket 275 can include short legs 280, each having a length of 3 inches. The mounting bracket 275 can then be placed between closely spaced ribs 270, while still allowing a user to have access to both sides of the brackets 275 as depicted in FIG. 17. Again, the mounting bracket 275 can have short legs 280 of any suitable length to clear the height of the rib structure 270. It is also to be appreciated that long legs 285, 290 of the mounting brackets 255, 275 can be of any suitable length to fit between two adjacent rib structures 270. Thus, the mounting brackets can have any suitable structure for overcoming clearance issues with respect to ribs or any other wall structure or surface irregularity, as is readily apparent to one of ordinary skill in the art. Moreover, the mounting brackets 255, 275 can include slots in the long legs 285, 290 such that the mounting brackets 255, 275 are slidably adjustable between the ribs 270.

As another alternative, if a user desires to mount the seal structure on a top portion of the ribs 270, a piece of wood or other suitable material can be secured to an area of the building between the ribs 270, such that mounting brackets can be mounted on a substantially flush surface.

Figure 18:
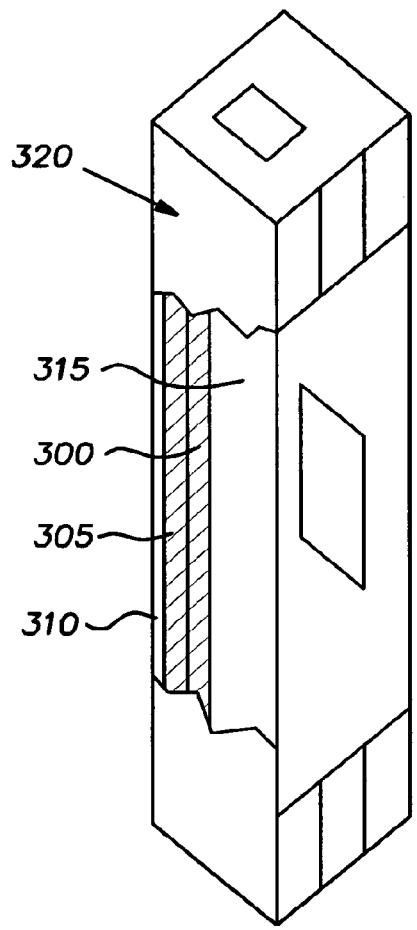
FIG. 18 illustrates a perspective view of a dock pad for use above a door opening, for example a door opening with a drip edge, or beside a door opening for a building with a ribbed wall surface, in accordance with aspects of the present invention.
Figure 19:
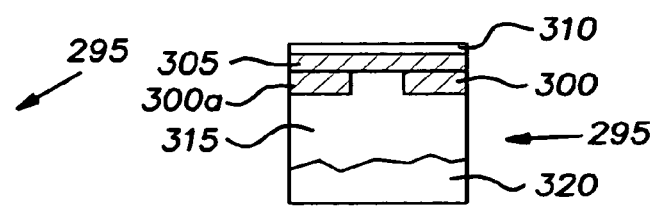
FIG. 19 illustrates a top view of a dock pad for use with a ribbed wall surface in accordance with an aspect of the present invention.

Turning now to FIGS. 18 and 19, an example of a dock pad 295 that can be employed with mounting brackets 255 or 275 is illustrated. Dock pad 295 can be used above a door opening that has a drip edge, or beside a door opening for a building that has a ribbed exterior surface, and the use of brackets 255 or 275 eliminates the need to cut out part of the drip edge or rib to mount the dock pad to the building. If mounting bracket 255 having a first short leg 260 of different length than a second short leg 265 is employed, it is recognized that the backing structures described above would not provide sufficient backing for the securing the mounting bracket 255 to the backing structure. Accordingly, the dock pad 295 can include an additional wood board 300 coupled to the backing 305 and located along a side of the dock pad 295 that corresponds with the longer of the first and second short legs 260, 265. A second board 300a, the same as board 300, can be added adjacent or attached to backing 305 on the opposite side of pad 295 from board 300, for use between 2 ribs where bracket 275 is used as per FIG. 17. The dock pad 295 also includes a first foam layer 310 to provide a seal between a wall surface of a building and the dock pad 295 and a second foam layer 315 to provide a seal between the dock pad 295 and a truck. A fabric covering 320 is provided to protect the dock pad 295 from environmental effects and preferably completely encases (all 4 sides) the dock pad 295 to protect from rain and other environmental elements.

Further, if a steel backing is employed rather than the wood backing 305, 300, 300a, a length of short legs on the steel backing can correspond with a length of the short legs on the mounting bracket. For example, if the mounting bracket is manufactured with one 2 inch leg and one 3 inch leg, the steel backing can also be manufactured to include one 2 inch leg and one 3 inch leg.

Figure 20:
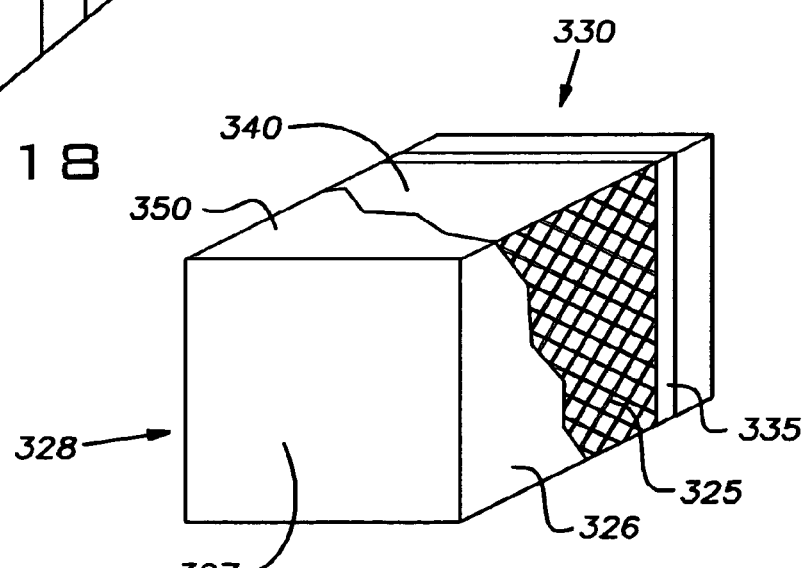
FIG. 20 illustrates a sectional view of the top portion of a side dock pad oriented vertically with the cover partially removed, having a theft deterrence structure in accordance with an aspect of the present invention.

Turning now to FIG. 20, the seal structures or dock pads described herein can also include a theft deterrence component. The theft deterrence component includes a metal structure 325, such as a strong net structure or chain link structure, located within an inner portion of the dock pad 330 such that the dock pad 330 cannot be easily cut open. For example, a rubber coated, chain link fence structure 325 can be secured to a first end portion of a backing structure 335 (which can be steel, wood, etc.), wrapped around a second foam layer 340 (for example, along one side 326, then across the front or outer face 327, then along the other side 328 (not shown)), and secured to a second end portion of the backing structure 335, such that all 3 exposed sides or faces of the second foam layer 340 are substantially or completely enclosed by the chain link fence structure 325. Alternatively, the theft deterrence component can be coupled to the dock pad such that it is only located on a side (such as 326 or 328) of the dock pad that is exposed during a loading and unloading operation. Thus, the metal structure 325 keeps thieves from cutting through the dock pad 330 to gain access to the building or to the truck. A fabric covering 350 can be provided to substantially enclose the dock pad 330 for aesthetic reasons and to protect the dock pad 330 from environmental elements. The theft deterrence component can be of any suitable structure and material and can be coupled to the dock pad in any suitable way to prevent cutting through the dock pad.

It is to be appreciated that the seal structures described herein can be employed with any shape or size door up to 10 feet wide and/or any size truck. Also, although the seal structures have been described herein as comprising a top pad and two side pads, it is to be appreciated that the seal structures can also include a bottom pad to provide a seal at a bottom portion of the door opening.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A loading dock door seal system comprising a loading dock doorway and a first dock pad and a mounting bracket, said doorway having a mounting surface, said dock pad being mounted adjacent said mounting surface with at least said mounting bracket, said mounting bracket being mounted between a first rib and a second rib, said dock pad comprising a rigid backing structure and a first foam layer portion extending from the backing structure, said backing structure being located between said first foam layer portion and said mounting surface, said mounting bracket having a long leg, a first short leg, and a second short leg which is substantially longer than said first short leg measured in a direction substantially perpendicular to said mounting surface, said second short leg being positioned adjacent said second rib, said first short leg being positioned adjacent to but spaced apart from said first rib, said second short leg having a first portion which extends beyond said second rib, said second short leg having an aperture in said first portion, the first rib extending a first distance from the mounting surface, the first short leg having an aperture for attachment to said dock pad, said first short leg aperture being located a second distance from the mounting surface, the second distance being less than the first distance.

2. The system of claim 1, wherein said first short leg is approximately 2 inches long.

3. The system of claim 1, wherein said second short leg is approximately 3 inches long.

4. The system of claim 1, wherein at least one of said apertures is a slot.

5. The system of claim 1, wherein said bracket is steel.

6. The system of claim 1, wherein said dock pad further comprises a second foam layer portion located between said backing structure and said mounting surface.

7. The system of claim 1, said first foam layer portion having a layer of foam, said first dock pad further comprising a theft deterrence component which covers a substantial portion of said layer of foam, said theft deterrence component being a metal structure.

8. The system of claim 1, wherein each of said ribs is a vertically-extending rib.

9. The system of claim 1, wherein the second short leg has a length effective to provide clearance for said second rib.

10. The system of claim 1, wherein the lengths of the first and second short legs differ by at least about 1 inch.

11. The system of claim 1, wherein said first foam layer portion comprises a flexible cover.

12. The system of claim 6, wherein said second foam layer portion comprises a flexible cover.

* * * * *